(12) United States Patent
Wargo et al.

(10) Patent No.: US 8,167,119 B2
(45) Date of Patent: May 1, 2012

(54) LOW-PRESSURE ACCUMULATION SYSTEM

(75) Inventors: Stephen G. Wargo, Laurel, MD (US);
Robert M. Poma, Gambrills, MD (US);
Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 90 days.

(21) Appl. No.: 12/841,244

(22) Filed: Jul. 22, 2010

(65) Prior Publication Data
US 2011/0017575 A1   Jan. 27, 2011

Related U.S. Application Data

(60) Provisional application No. 61/227,959, filed on Jul. 23, 2009.

(51) Int. Cl.
*B65G 17/24* (2006.01)
(52) U.S. Cl. ............... 198/779; 198/836.1; 198/838
(58) Field of Classification Search .......... 198/779, 198/836.1, 836.4, 838
See application file for complete search history.

(56) References Cited

U.S. PATENT DOCUMENTS

| | | | | |
|---|---|---|---|---|
| 2,899,041 A | * | 8/1959 | Saint-Andre | 198/779 |
| 3,701,413 A | * | 10/1972 | Leahy et al. | 198/779 |
| 5,044,920 A | * | 9/1991 | Gerlach | 425/445 |
| 5,224,583 A | | 7/1993 | Palmaer et al. | |
| 5,328,020 A | * | 7/1994 | Clopton | 198/779 |
| 6,016,903 A | * | 1/2000 | Lochbrunner | 198/370.1 |
| 6,168,011 B1 | * | 1/2001 | Morsbach | 198/779 |
| 6,571,937 B1 | | 6/2003 | Costanzo | |
| 6,874,617 B1 | | 4/2005 | Layne | |
| 7,311,192 B2 | | 12/2007 | Fourney | |
| 7,426,992 B2 | | 9/2008 | Fourney | |
| 2006/0260913 A1 | * | 11/2006 | Wolf et al. | 198/812 |
| 2010/0065403 A1 | | 3/2010 | Fourney | |

OTHER PUBLICATIONS

Product Line Extension: Series 900 Flush Grid with Insert Rollers datasheet, copyright 2004, Intralox, L.L.C., Harahan, Louisiana, U.S.A.

* cited by examiner

*Primary Examiner* — Mark A Deuble
(74) *Attorney, Agent, or Firm* — James T. Cronvich

(57) ABSTRACT

A low-pressure accumulation system and a conveyor belt in an accumulation conveyor for the use with the system. The belt, which is flanked on opposite sides by lines of gravity rollers, has a longitudinal lane of article-supporting belt rollers arranged in groups along the length of the conveyor belt. The groups are spaced apart from each at regular intervals. Trays sit atop the gravity rollers until they are lifted slightly higher by one of the slightly elevated groups of article-supporting belt rollers, which engage the bottom of the tray and convey it along toward a discharge end. Retractable stops selectively block the trays from advancing on the accumulation conveyor. The freely rotatable article-supporting belt rollers roll along the bottoms of any blocked and accumulated trays and provide low back pressure. The belt may also include low-friction rollers that ride on bearing surfaces below the belt to help lower friction between the belt and the conveyor structure while the belt is running.

15 Claims, 3 Drawing Sheets

LOW-PRESSURE ACCUMULATION SYSTEM

CROSS-REFERENCE TO RELATED APPLICATIONS

This application claims the priority of U.S. provisional patent application Ser. No. 61/227,959, "Low-Pressure Accumulation System," filed Jul. 23, 2009, which is incorporated in this application by reference.

BACKGROUND

The invention relates generally to power-driven conveyors and, more particularly, to accumulators using conveyor belts with freely rotatable rollers.

In the parcel-delivery and postal industries, conveyors transport packages and letters in trays through a plant for sorting and other processing. Often a number of accumulation conveyors positioned along the length of a main conveyor feed trays onto the main conveyor. To allow the trays to accumulate on the accumulation conveyors to prevent collisions and overcrowding on the main conveyor, the accumulation conveyors use controllable gates to coordinate the blocking and releasing of trays to be fed onto the main conveyor. Conventionally, roller conveyors or roller-top conveyor belts are used as the accumulation conveyors. But roller conveyors are noisy and difficult to maintain and repair. And the roller-top belts conventionally used have more rollers than necessary.

SUMMARY

These shortcomings are overcome by a low-pressure accumulation system embodying features of the invention. One version of such an accumulation system comprises a conveyor belt flanked by side supports, such as longitudinal lines of gravity rollers. The conveyor belt is arranged to advance longitudinally in a direction of belt travel along a carryway run. The belt includes a top surface that extends laterally across the width of the belt from a first side to an opposite side. Article-supporting belt rollers in the belt each have a salient portion that extends above the belt's top surface to a contact level at the bottoms of supported articles. The belt rollers, which rotate freely on lateral axes perpendicular to the direction of belt travel, are arranged in one or more laterally spaced longitudinal lanes. The belt rollers in each lane are, in turn, arranged in longitudinally spaced groups. Longitudinally consecutive belt rollers in each group are spaced apart a first distance. Longitudinally consecutive groups are spaced apart a second distance that is greater than the first distance. The side supports laterally flank the first and second sides of the conveyor belt to support the bottoms of articles conveyed on the belt.

In another aspect of the invention, a low-pressure accumulation system comprises a plurality of conveyor belts and side supports as described arranged in parallel. A retractable stop at the carryway end of the conveyor belt selectively blocks articles conveyed on the conveyor belt and releases them to the discharge conveyor abutting the conveyor belts at the ends of their carryways.

According to another aspect of the invention, a conveyor belt comprises article-supporting belt rollers and low-friction belt rollers. The article-supporting belt rollers, which rotate freely, are arranged in a longitudinal lane along the length of the conveyor belt. The article-supporting belt rollers in the lane are further arranged in a series of groups regularly spaced from each other along the length of the belt. The article-supporting belt rollers in each group are, in turn, regularly spaced from each other along the length of the conveyor belt. The low-friction belt rollers extend below the belt into rolling contact with conveyor bearing surfaces as the belt advances. The low-friction belt rollers are out of contact with articles conveyed atop the article-supporting belt rollers.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
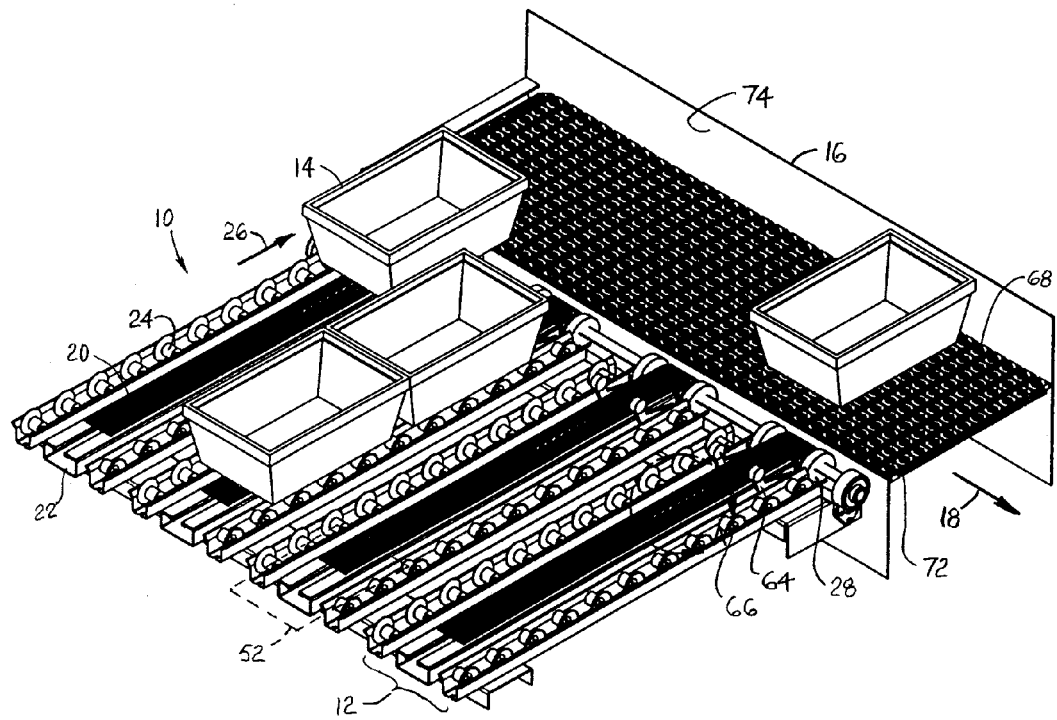
FIG. 1 is an isometric view of a low-pressure accumulation system embodying features of the invention.

A low-pressure accumulation system embodying features of the invention is shown in FIGS. 1-4. The accumulation system 10 shown has four accumulation conveyors 12 feeding articles, such as mail trays 14, in parallel to a discharge conveyor 16 advancing in a discharge direction 18. Each accumulation conveyor has a conveyor belt 20 mounted on a conveyor frame 22. A line of gravity rollers 24 flanks the conveyor belt on each side. The two lines of gravity rollers serve as side supports supporting the bottoms of the trays under their outer sides. The conveyor belt, advancing in a direction of belt travel 26, conveys the trays toward the discharge conveyor 16. The four conveyor belts shown are trained around drive sprockets 28 at the discharge end adjacent to the discharge conveyor and idle sprockets (not shown) at the opposite infeed end of the low-pressure accumulation conveyor system. The sprockets are mounted on a drive shaft 30 that is rotated by a drive train 32 and a motor 34.

Figure 4:
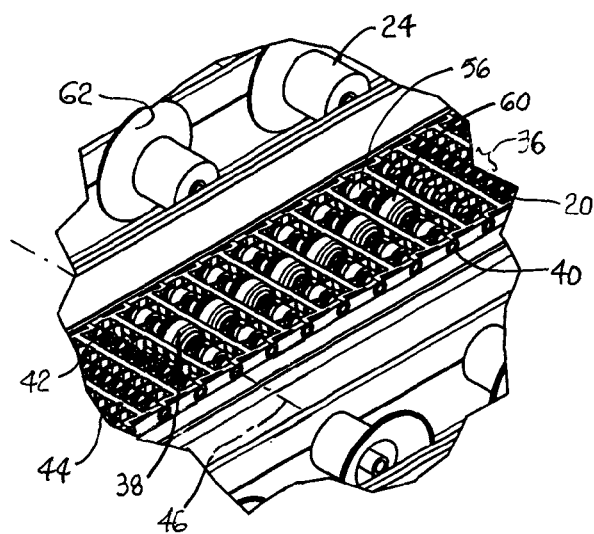
FIG. 4 is an enlarged view of a portion of the low-pressure accumulation system of FIG. 1, illustrating the details of the conveyor belt.

As best shown in FIG. 4, the conveyor belt 20 has a longitudinal lane 36 of article-supporting belt rollers 38 extending along the length of the belt midway between its sides. The article-supporting belt rollers are regularly spaced from each other along the length of the belt and mounted on hinge pins 40 that extend laterally through aligned holes in the interleaved hinge elements 42 between consecutive modules 44 of the modular plastic conveyor belt 20. The rollers could alternatively be mounted to rotate on dedicated axles instead of the hinge pins. The article-supporting belt rollers 38 are freely rotatable on the hinge pins or dedicated axles. (A belt roller is "freely rotatable" when it contacts no bearing surfaces external to the belt other than a product load.) The hinge pins define axes of rotation 46 perpendicular to the direction of belt travel 26. Because the article-supporting belt rollers 38 are freely rotatable, when trays atop the rollers are blocked, the conveyor belt can continue to advance without subjecting a line of backed-up trays to significant back line pressure. The rollers just roll along the bottoms of the stationary, blocked trays as the belt advances.

Figure 2:
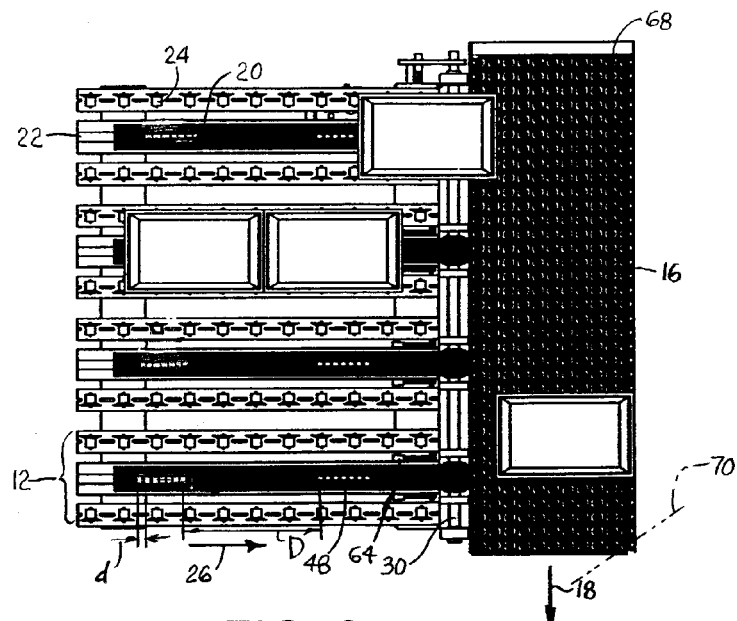
FIG. 2 is a top plan view of the low-pressure accumulation system of FIG. 1.
Figure 3:
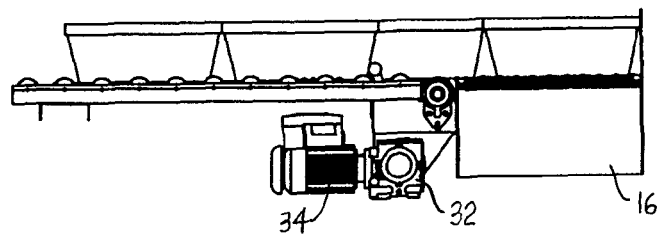
FIG. 3 is a side elevation view of the low-pressure accumulation system of FIG. 1.

As best shown in FIG. 2, the longitudinal lane 36 of article-supporting belt rollers 38 is further arranged in groups 48 of rollers—in this example, in groups of seven consecutive rollers. The groups are spaced from each other at regular intervals with the lead roller of a trailing group separated from the trailing roller of a consecutive leading group by a distance D. The inter-group distance D is greater than the distance d between consecutive rollers in each group. The group interval is determined by the speed of the conveyor belt and the desired rate of discharging trays from the conveyor. A spacing of 6 ft would result in a discharge every 4-5 s for a typical belt running speed.

Figure 5:
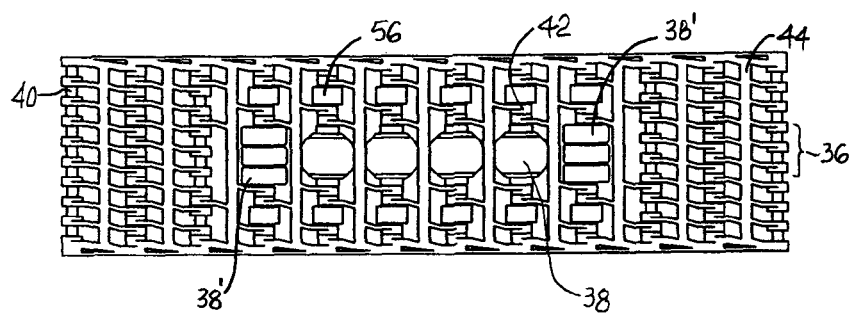
FIG. 5 is a top plan view of another version of a conveyor belt usable in a low-pressure accumulation system as in FIG. 1.
Figure 6A:
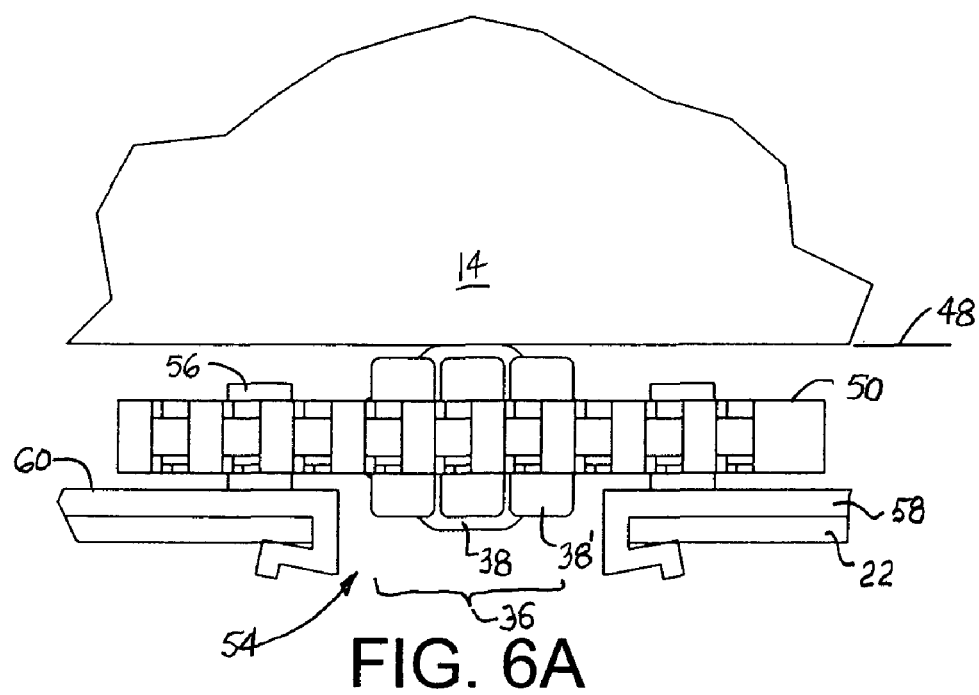
FIG. 6A is an enlarged view of a portion of FIG. 6.
Figure 6:
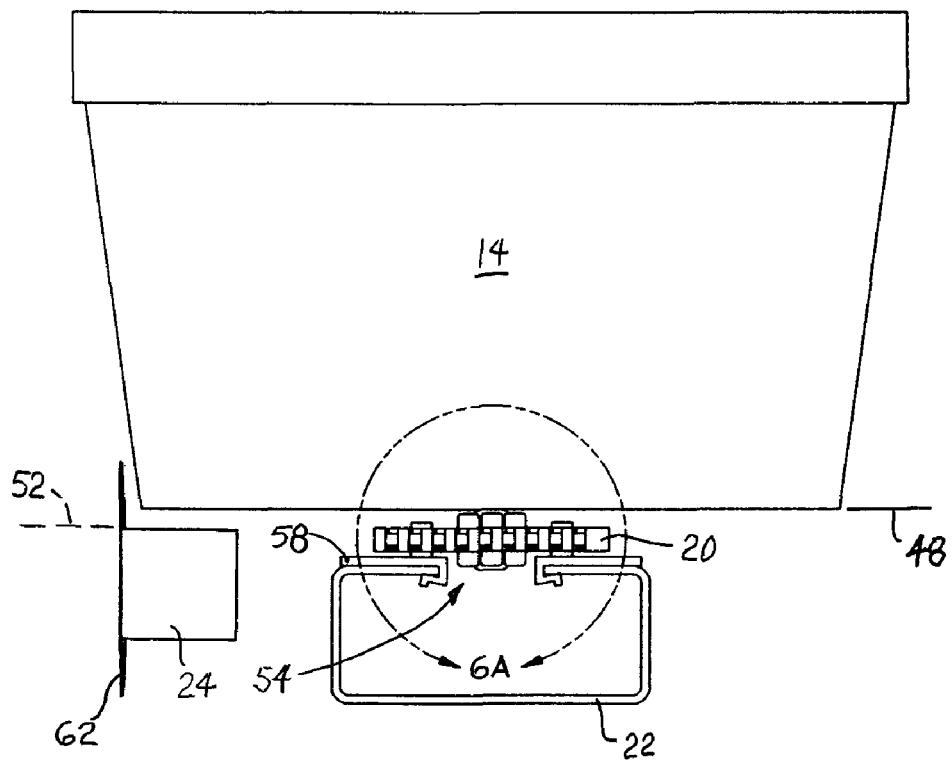
FIG. 6 is a cross section of the conveyor belt of FIG. 5 in the low-pressure accumulation of FIG. 1.

The conveyor belt shown in FIG. 4 has a lane of single article-supporting belt rollers 38 at each position along the length of the belt. Another version of conveyor belt, as shown in FIGS. 5 and 6, has single rollers 38 at some positions, but three narrow rollers 38' coaxially aligned in lateral abutment at the leading and trailing positions of the group of rollers in the longitudinal lane 36. Like the rollers in the conveyor belt 20 of FIG. 4, both the narrow rollers 38' and the wide rollers 38 are rotatably mounted on a hinge pin 40 that extends laterally through the interleaved hinge elements 42 between consecutive rows of belt modules 44. As shown in FIGS. 6 and 6A, the diameter of the wide rollers 38 is greater than the diameter of the narrow rollers 38'. A tray 14 is supported on the conveyor belt 20 atop the article-supporting belt rollers 38, 38' as they pass under the tray. The tops of the article-supporting belt rollers 38 in contact with the bottom of the tray define a contact level 48 above a top surface 50 of the conveyor belt. This contact level is slightly above the level of a horizontal plane 52 tangent to the top support surfaces of the gravity rollers 24, as also shown in FIG. 1.

The conveyor belt is supported on the conveyor frame 22. The conveyor frame may be constructed out of an elongated sheet of steel bent to form a rectangular cross section with a slot 54 running the length of the conveyor down the middle. The slot admits the longitudinal lane 36 of article-supporting belt rollers 38 so that they are free to rotate without contact other than with the trays.

For long runs, it may be preferable to lower the friction between the belt and the conveyor frame as the belt advances. Low-friction belt rollers 56 may be used for that purpose as shown in FIGS. 4-6. Like the article-supporting belt rollers 38, the low-friction belt rollers 56 may be mounted on the hinge pins 40. They may be positioned in groups like the article-supporting rollers or they may be scattered along the belt. Unlike the article-supporting rollers, the low-friction rollers are positioned to ride on clip-on UHMW wear strips 58 forming bearing surfaces 60 underlying the belt. This allows the belt to roll, rather than slide, along the bearing surfaces in low-friction engagement. The diameter of the low-friction belt rollers 56 is less than the diameters of the article-engaging belt rollers 38, 38' when all are mounted on the hinge pins. But both kinds of rollers could have the same diameter so long as the low-friction rollers are mounted on axles below the article-supporting rollers to prevent the low-friction rollers from contacting the bottoms of the trays.

In operation, a tray 14 is fed onto the infeed end of one of the accumulation conveyors 12, supported only on its outer bottom sides on the gravity rollers 24. When a group 48 of article-supporting belt rollers 38 advances with the conveyor belt 20 into contact with the bottom of the tray, the rollers 38 lift the tray up to the contact level 48 slightly above the gravity rollers and convey the tray toward the discharge conveyor 16.

The article-supporting belt rollers 38 preferably have a tread 60 (FIG. 4) made of a high-friction material for a better grip on the bottoms of the trays. Flanges 62 on the outer sides of the gravity rollers confine the tray to the accumulation conveyor. In the alternative belt shown in FIGS. 5 and 6, the narrow article-supporting rollers 38' at the front and rear of each group have a slightly smaller diameter than the wide rollers 38 in the middle of each group. This provides a more gradual lifting of the trays onto and lowering of the tray off the rollers. At the discharge end of the accumulation conveyor, the trays encounter a retractable stop 64 (FIGS. 1 and 2) that is pivotable between a raised position blocking the advance of the trays and a lowered position releasing the trays to be fed onto the discharge conveyor. The stop shown comprises a pair of arms with rollers 66 on top to provide rolling contact with the trays during release. When the trays are blocked by the stop, the article-supporting belt rollers roll along the bottoms of the accumulated trays. When the stop is lowered to its release position, the released tray is picked up by the next passing group of article-supporting rollers in the belt and pushed into the discharge conveyor. The release of trays by the stops and the speed of the belts are controlled by a controller. Position sensors, such as photo eyes or proximity switches, may also be used to indicate to the controller that a tray has cleared the stop and has been fed onto the discharge conveyor. The discharge conveyor 16, shown in this example (see FIGS. 1 and 2) as running perpendicular to the accumulation conveyors 12, has rollers 68 arranged to rotate on axles 70 oblique to the direction 18 of discharge. The rollers are actuated by a bearing surface 72 underlying the rollers. The rollers ride on the bearing surface and push the trays into registration against a far side wall 74 as they are conveyed along the discharge conveyor.

Although the invention has been described in detail with reference to a couple of preferred versions, other versions are possible. For example, multiple longitudinal lanes of article-supporting belt rollers laterally spaced from each other to support trays at more places may be used. For lightweight articles, the lines of gravity rollers could be replaced by wear strips serving as side supports for the articles. The low-pressure belt rollers may be eliminated in short runs for which friction between the belt and the conveyor frame is not so important. So, as these few examples suggest, the scope of the claims is not meant to be limited to the details of the versions described.

What is claimed is:

1. A low-pressure accumulation system comprising:
  a conveyor belt arranged to advance longitudinally in a direction of belt travel along a carryway run, wherein the conveyor belt includes:
    a top surface extending laterally in width from a first side to an opposite second side;
    a plurality of article-supporting belt rollers, each having a salient portion extending above the top surface of the conveyor belt to a contact level at the bottoms of supported articles conveyed atop the article-supporting rollers,
      wherein the article-supporting belt rollers rotate freely on lateral axes perpendicular to the direction of belt travel, and
      wherein the article-supporting belt rollers are arranged in one or more laterally spaced longitudinal lanes of article-supporting belt rollers,
    and wherein the article-supporting belt rollers in each lane are arranged in longitudinally spaced groups, wherein longitudinally consecutive article-supporting belt rollers in each group are spaced apart a first distance and wherein longitudinally consecutive groups are spaced apart a second distance greater than the first distance;

side supports laterally flanking the first and second sides of the conveyor belt to support the bottoms of articles conveyed on the conveyor belt.

2. A low-pressure accumulation system as in claim 1 wherein the side supports comprise:

first and second longitudinal lines of gravity rollers laterally flanking the first and second sides of the conveyor belt, wherein the gravity rollers are freely rotatable on axes perpendicular to the direction of belt travel.

3. A low-pressure accumulation system as in claim 2 wherein the gravity rollers include outer flanges to confine conveyed articles.

4. A low-pressure accumulation system as in claim 2 wherein the gravity rollers define a tangent plane above the top surface of the conveyor belt and slightly below the contact level of the article-supporting belt rollers.

5. A low-pressure accumulation system as in claim 1 wherein the article-supporting belt rollers are arranged in a single longitudinal lane midway between the first and second sides of the conveyor belt.

6. A low-pressure accumulation system as in claim 1 wherein article-supporting belt rollers include narrow rollers and wide rollers and wherein multiple narrow rollers are positioned in coaxially abutting relationship in a first set of roller positions in a longitudinal lane and the wide rollers are positioned singly in a different second set of roller positions in the longitudinal lane.

7. A low-pressure accumulation system as in claim 6 wherein the narrow rollers have a smaller diameter than the wide rollers.

8. A low-pressure accumulation system as in claim 1 further comprising conveyor bearing surfaces underlying the conveyor belt and wherein the conveyor belt further includes a plurality low-friction belt rollers below the contact level and in contact with the bearing surfaces to roll on the bearing surfaces as the conveyor belt advances and wherein the article-supporting belt rollers are out of contact with the bearing surfaces.

9. A low-pressure accumulation system as in claim 8 wherein the article-supporting belt rollers have a first diameter and the low-friction belt rollers have a second diameter less than the first diameter.

10. A low-pressure accumulation system as in claim 1 further comprising:

a plurality of the conveyor belts and the side supports as in claim 1 arranged in parallel;

a discharge conveyor abutting the conveyor belts at carryway ends of the conveyor belts to receive articles from the conveyor belts; and retractable stops at the carryway ends of the conveyor belts selectively blocking articles conveyed atop the article-supporting belt rollers and the side supports from advancing off the conveyor belt and alternately releasing the articles to the discharge conveyor.

11. A conveyor belt comprising:

a plurality of freely rotatable article-supporting belt rollers arranged in a longitudinal lane along the length of the conveyor belt, wherein the article-supporting belt rollers are arranged in a series of groups regularly spaced from each other by a first distance along the length of the conveyor belt and wherein consecutive ones of the article-supporting belt rollers in each group are regularly spaced from each other by a second distance along the length of the conveyor belt, wherein the first distance is greater than the second distance;

a plurality of low-friction belt rollers extending below the belt into rolling contact with conveyor bearing surfaces as the conveyor belt advances, wherein the low-friction belt rollers are out of contact with articles conveyed atop the article-supporting belt rollers.

12. A conveyor belt as in claim 11 wherein the article-supporting belt rollers have a first diameter and the low-friction belt rollers have a second diameter less than the first diameter.

13. A conveyor belt as in claim 11 wherein the article-supporting belt rollers are arranged in a single central longitudinal lane.

14. A conveyor belt as in claim 11 wherein article-supporting belt rollers include narrow rollers and wide rollers and wherein multiple narrow rollers are positioned in laterally abutting relationship in a first set of roller positions along the length of the longitudinal lane and the wide rollers are positioned singly in a different second set of roller positions along the length of the longitudinal lane.

15. A conveyor belt as in claim 14 wherein the narrow rollers have a smaller diameter than the wide rollers.

\* \* \* \* \*